A. CALLESON.
MACHINE FOR OPERATING ON TUBULAR ARTICLES.
APPLICATION FILED JULY 25, 1917.
1,289,390.
Patented Dec. 31, 1918.
7 SHEETS—SHEET 5.
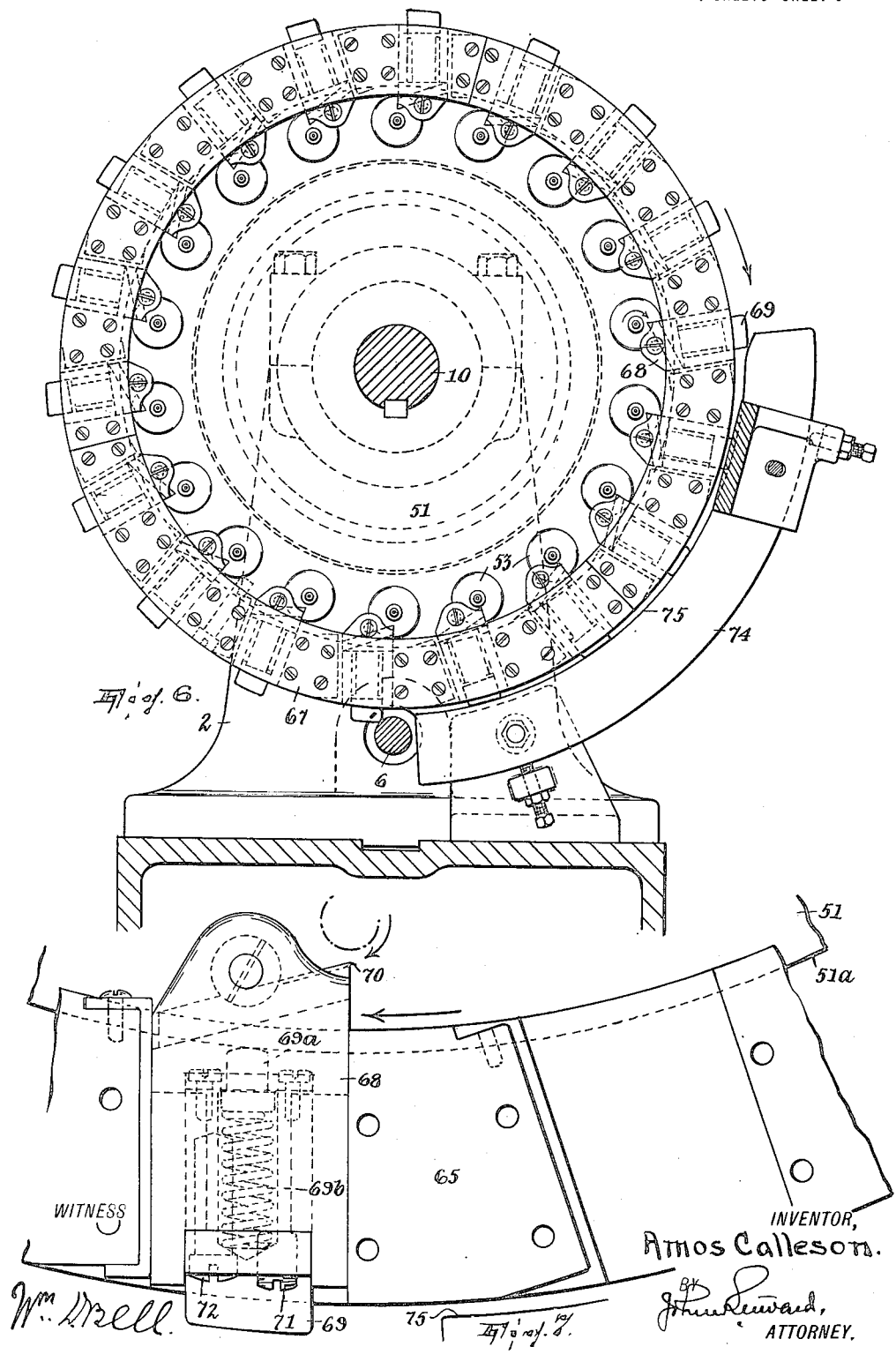
INVENTOR,
Amos Calleson.
WITNESS
Wm. D. Bell.
John Renard,
ATTORNEY.

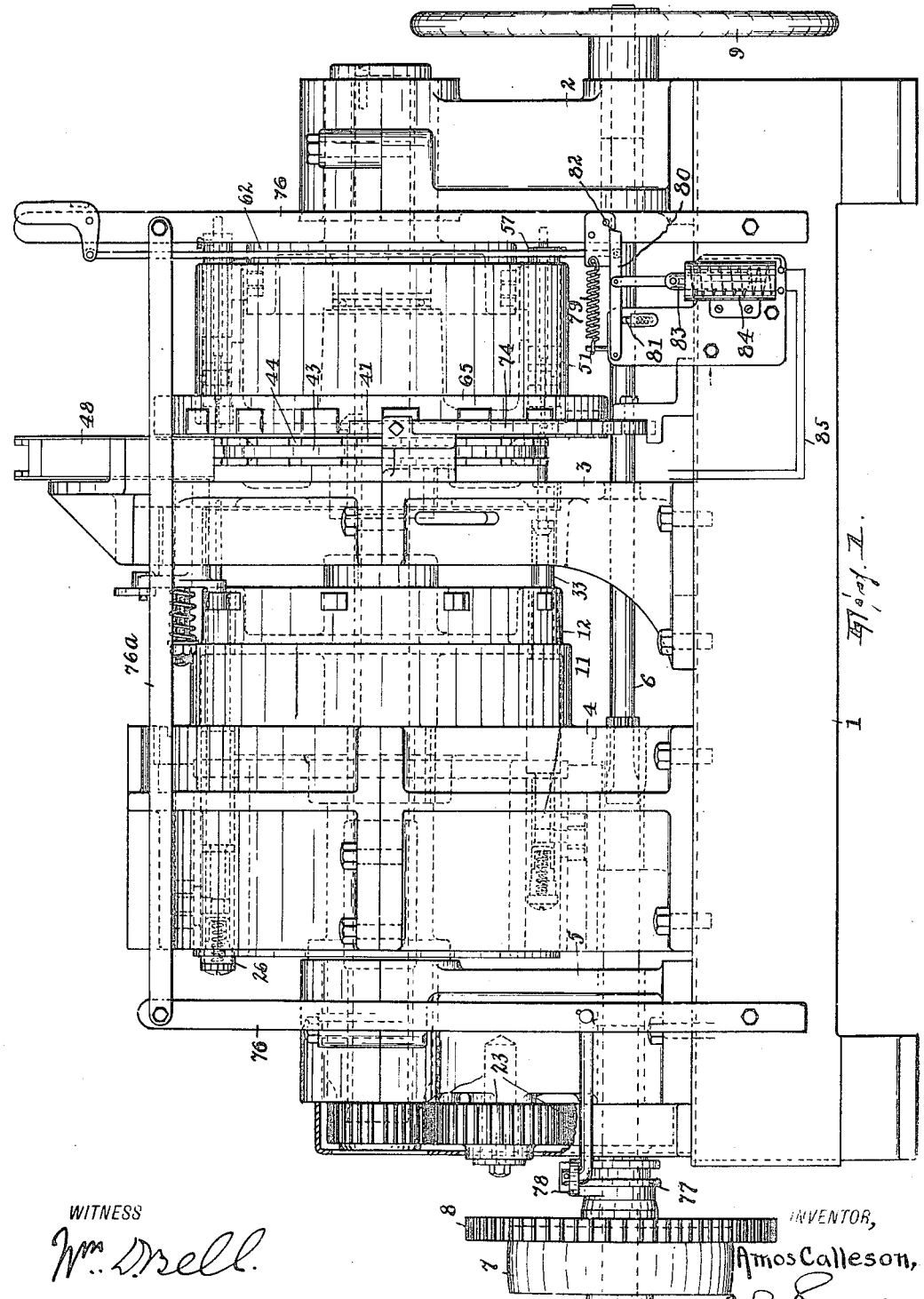

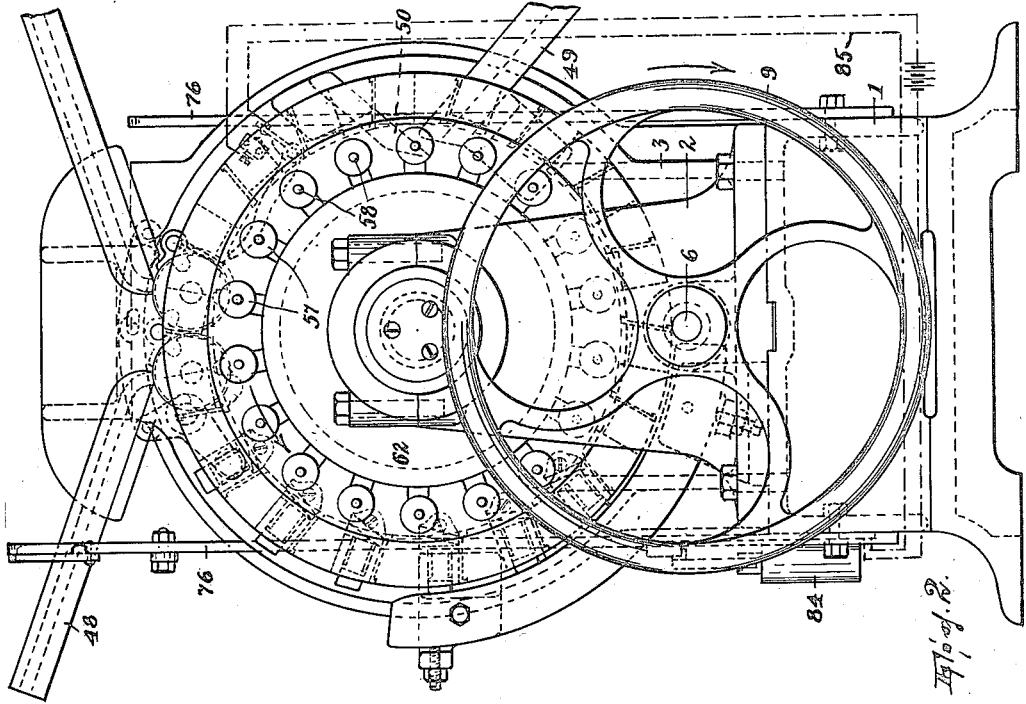
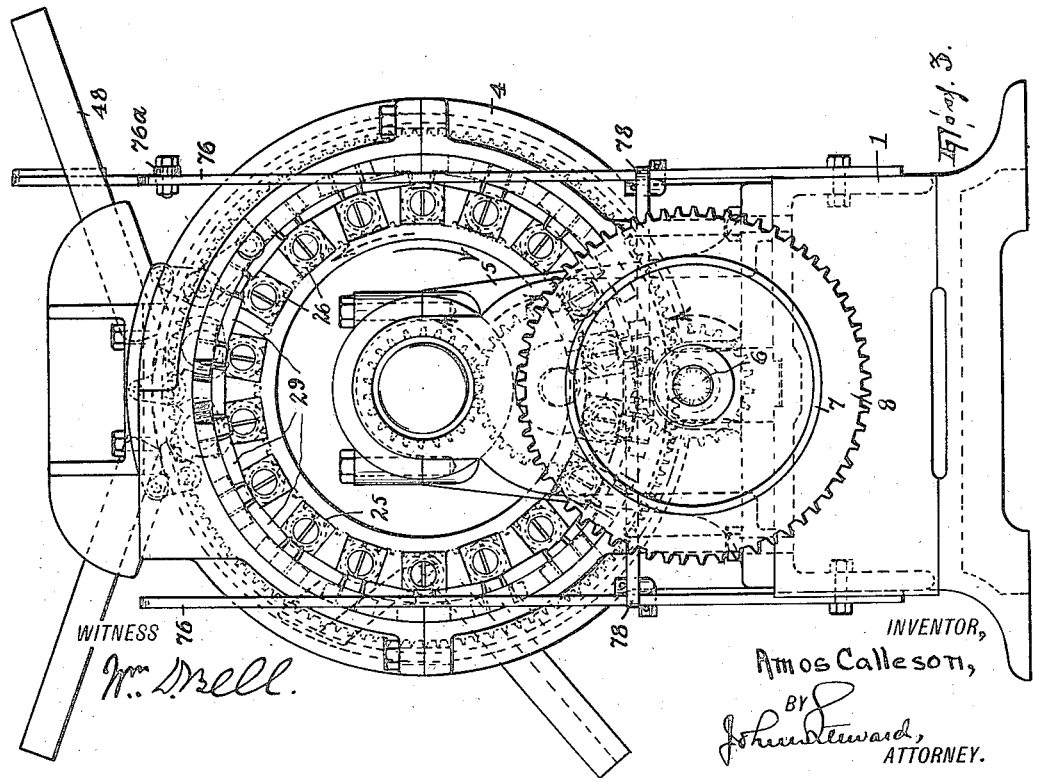

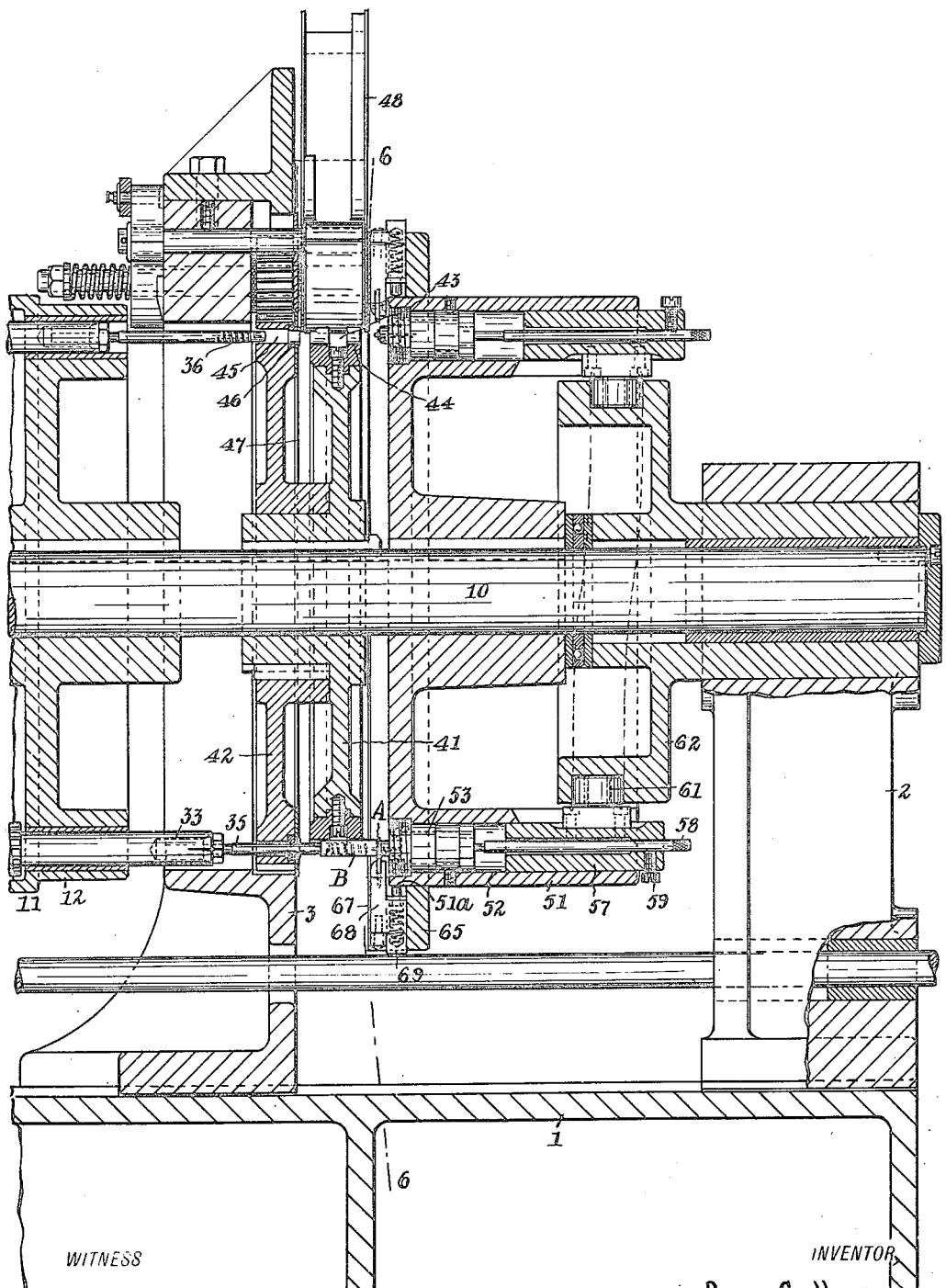

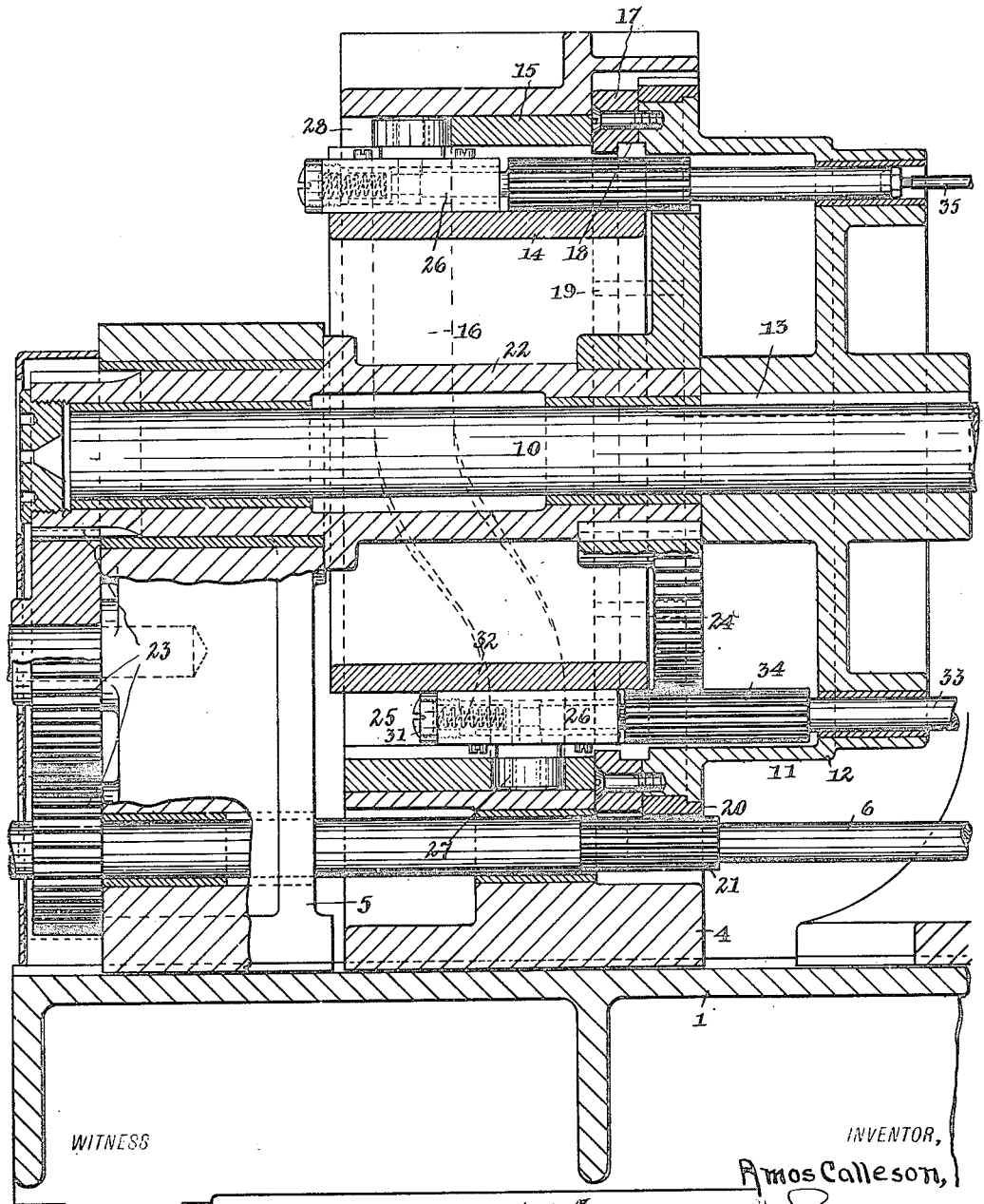

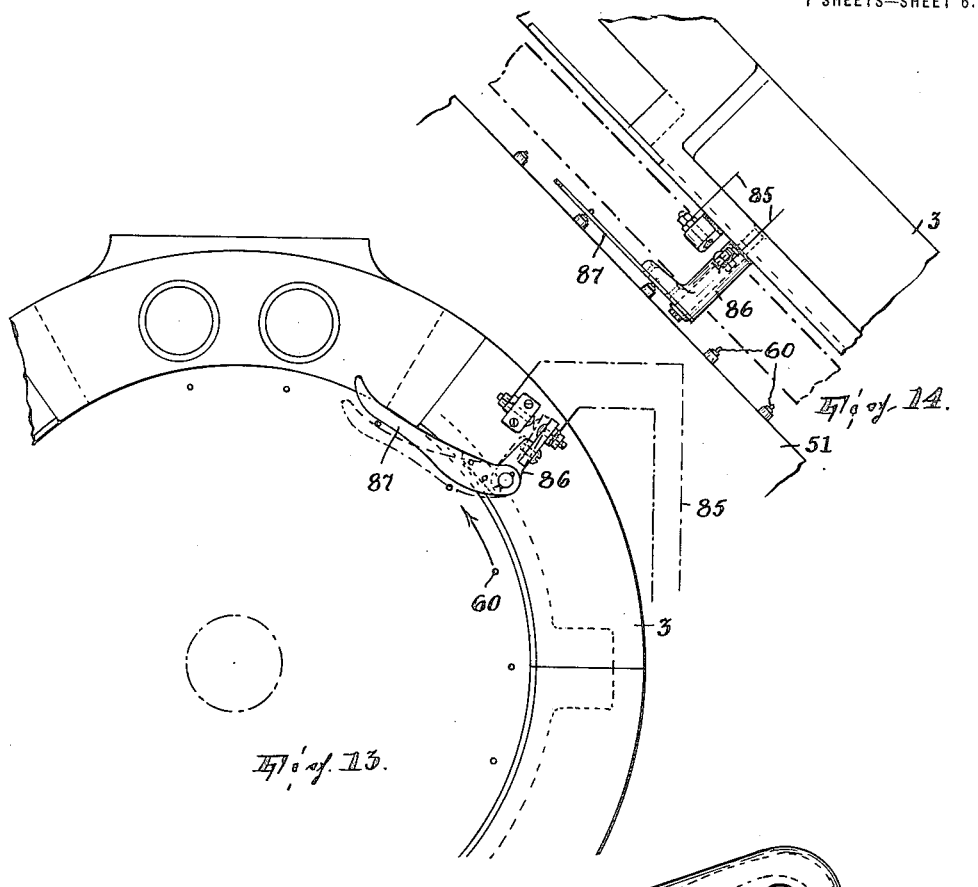
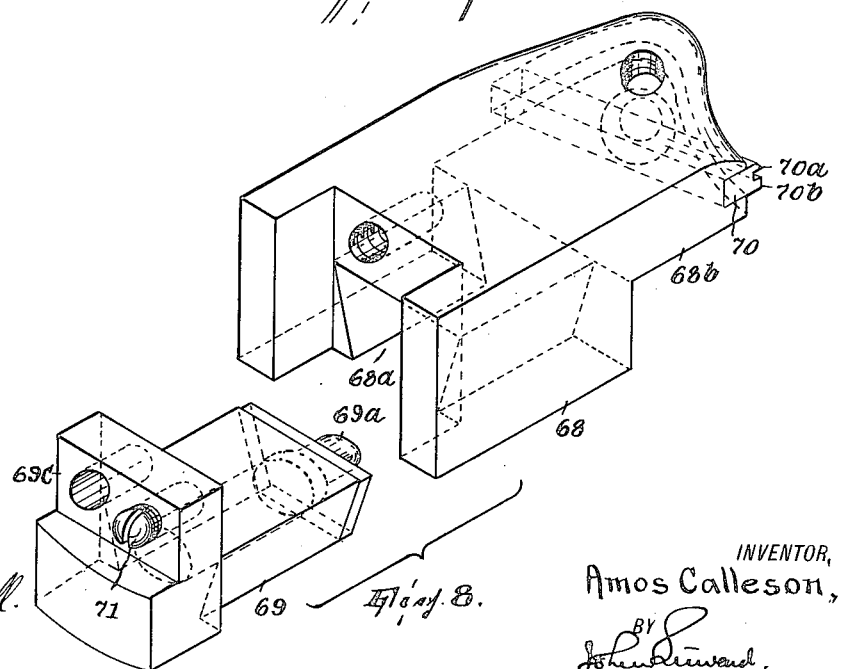

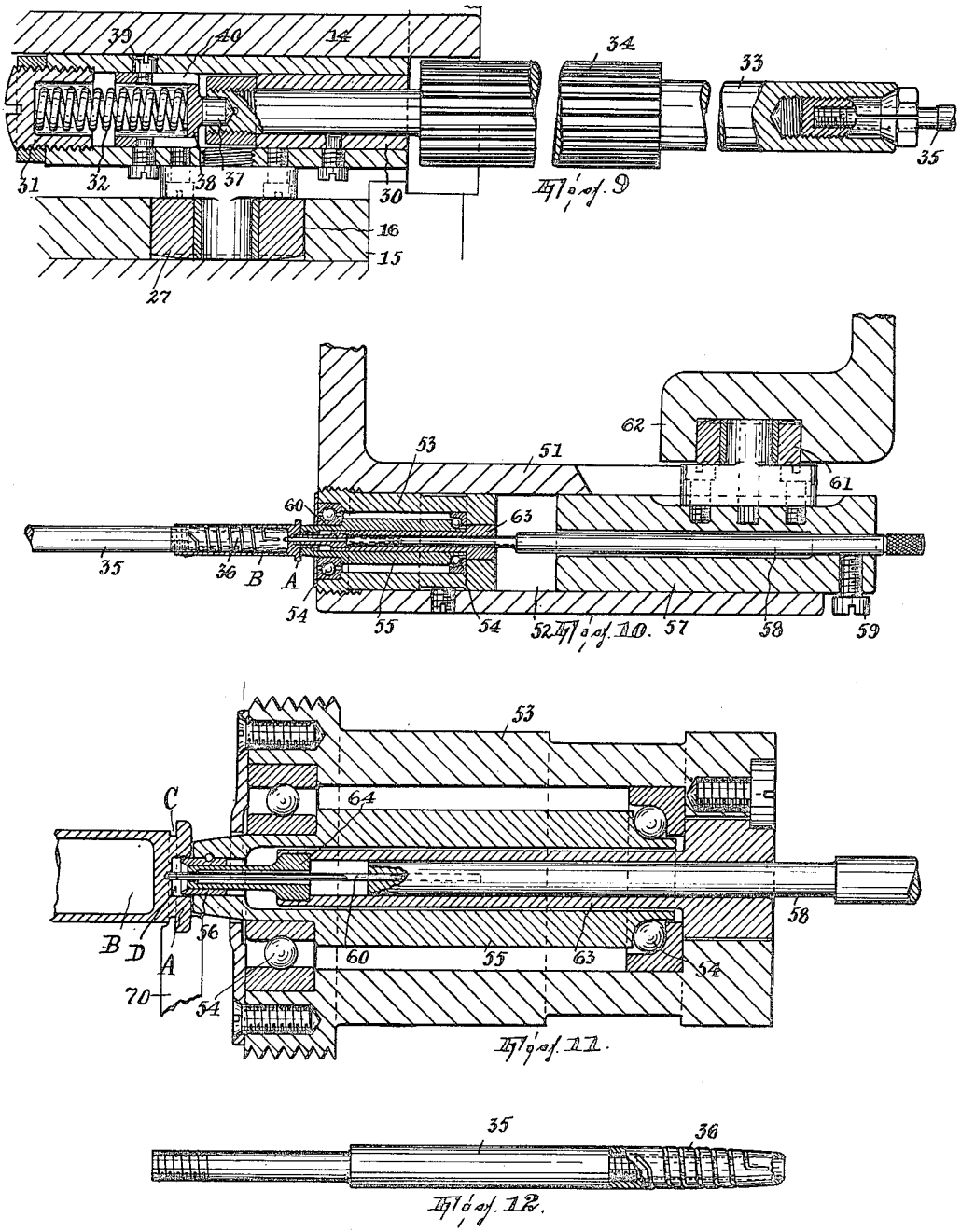

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

MACHINE FOR OPERATING ON TUBULAR ARTICLES.

1,289,390.  Specification of Letters Patent.  Patented Dec. 31, 1918.

Application filed July 25, 1917. Serial No. 182,627.

*To all whom it may concern:*

Be it known that I, AMOS CALLESON, a citizen of the United States, residing at Brooklyn, in the county of Kings and State of New York, have invented certain new and useful Improvements in Machines for Operating on Tubular Articles, of which the following is a specification.

This invention relates to means for performing operations circumferentially and longitudinally on tubular articles, such as the forming of the cannelures and priming holes in shells to form cartridge shells. The principal object of the invention is to provide a machine for turning out as large a quantity of product as is consistent with good work in a given time. The shells, suitably delivered in succession to a rotating carrier, are, while being carried around by the carrier, subjected to the action of tools which perform on the one hand the circumferential operation and on the other the longitudinal operation, there being preferably as many tools for performing each of these operations as there are shells adapted to be accommodated in the carrier, and such tools being arranged to progress rotatively with the carrier.

In the accompanying drawings,

Figure 1 is a side elevation of the machine and Figs. 2 and 3 front and rear elevations, respectively;

Figs. 4 and 5 are vertical sectional views, each in the plane of the central axis of the machine, of its forward and rearward portions;

Fig. 6 is a vertical sectional view on the line 6—6 of Fig. 4, looking forwardly;

Fig. 7 is an enlarged fragmentary rear elevation of a part of the means, directly including one of the radially movable tools, for operating circumferentially on the shells;

Fig. 8 is a perspective view of the holder for one of such tools, its parts being separated;

Figs. 9 and 10 show, partly in side elevation and partly in longitudinal section, the train of elements directly involved in holding and rotating each shell and performing the longitudinal operation thereon;

Fig. 11 is an enlarged longitudinal sectional view of what is shown in Fig. 10;

Fig. 12 is a detail of the mandrel proper shown in Figs. 9 and 10; and

Figs. 13 and 14 are front and side elevations of an electro-magnetic stop-motion mechanism.

There is a base 1 on which are arranged four alined standards 2, 3, 4 and 5. Standards 3 and 4 are circular in end elevation and each is preferably made in two sections, upper and lower, as shown, bolted together. Standards 2, 4 and 5 afford bearings for a horizontal drive shaft 6. At one end this shaft carries a pulley 7 and a gear 8 whereby, either through a belt or motor, the shaft may be power-driven; at its other end it carries a wheel 9 whereby it may be turned by hand. Parallel with and above shaft 6 is a shaft 10 journaled in a sleeve 22 (in turn journaled in standard 5) and in the hub of a barrel cam 62 which is suitably held against rotation in the standard 2.

A turret or mandrel carrier 11 formed in two sections is arranged to rotate around shaft 10. The forward section 12 is keyed to the shaft at 13 and the rear section 14 is housed within the circular opening of the standard 4, being in fact journaled in a barrel cam 15 which is fitted into and suitably fixed in said opening, its camway being indicated at 16; the turret section 14 is kept up to the turret section 12 (bound to shaft 10 against longitudinal movement thereof by the key 13) by a ring 17 secured to the turret section 12, the ring and turret section 14 having a suitable flange-interlock 18, and the turret sections are interlocked for rotation together by the dowels 19. The turret is driven through a gear 20 on turret section 12 and a pinion 21 on shaft 6.

Journaled in the standard 5 is a sleeve 22 which at its rear end is connected by gearing 23 with the shaft 6 and at its forward end carries a gear 24 keyed thereon; the structure 22—24 may afford a bearing, intermediate the bearings in standards 2 and 5, for shaft 10, and it is confined against endwise movement by the turret section 12 and standard 5.

In the periphery of the turret section 14 are arranged at equal intervals a series of slots 25 parallel with its axis of rotation. In each slot is arranged a slide 26 equipped with a roller 27 which runs in the camway 16 and may be admitted thereto on assembling through an opening 28, Fig. 5. The slides are confined in slots 25 by the plates 29, Fig. 3. Each slide contains a bushing 30 at its forward end and an adjusting screw 31 screwed into its rear end, the latter being cup-shaped and receiving one end of a spiral spring cushion 32. It will be obvious that when the turret rotates the slides, due to the camway 16, will reciprocate parallel with shaft 10 as they travel around the turret. Each slide controls a rotary mandrel as follows:

The mandrel includes a chuck 33 having an elongated pinion 34 formed thereon, and a spindle-like mandrel proper 35 removably held axially therein and having its portion 36 (preferably a separate part screw-jointed to the body of such mandrel proper) a somewhat tapering tubular spiral spring shell holder; the rear end of the chuck 33 is journaled in the bushing 30 which contains the bearing stud 37 of a socket 38 slidable longitudinally in the slide 26 but held from turning by screws 39 tapped into the slide, which engage in slots 40 in said socket, such socket receiving the forward end of spring 32. The mandrel has its pinion 34 meshing with gear 24, and forward of its pinion it is preferably journaled in the turret section 12. In view of the foregoing it will be apparent that when shaft 6 is driven a planetary movement will occur as between the gear 24 and the mandrels which are rotated on their own axes as they travel around with the turret. During such movement the mandrels receive back and forth movement as described, being retracted for approximately one quarter and advanced for approximately the remainder of the cycle of movement of the turret.

Forward of the turret and partly housed in the standard 3 is a carrier for the shells or other articles being operated upon. It includes a carrier disk 41 keyed to the shaft and a stripper disk 42 keyed on the hub of the disk 41 back of the latter. The periphery of the disk 41 is circumferentially grooved, as at 43, and has a series of pockets 44 axially alined with the several mandrels, the mandrels proper of which extend through holes 45 in the disk 42 and reciprocate into and out of said pockets (Fig. 4). The disk 42 has, axially alined with each pocket, a stripper 46 adapted to be penetrated by the mandrel proper. These strippers are removably held to said disk, so that others of different length may be substituted, by the circular plate 47.

The shells are deposited in the pockets so as to rest horizontally therein by any suitable means forming no part of the present invention. One such means that may be employed is shown in my application for patent for machine for operating on tubular articles, filed January 23rd, 1917, Serial No. 143945. The shell chutes 48 in Figs. 1 to 4 hereof represent a part of such means.

After each shell has been deposited in its pocket, the corresponding mandrel advances and its rotating spiral holder 36 is caused to telescope and thereupon rotate the shell in the pocket while traveling around the axis of shaft 10, the shell being at that time held contrary to the thrust of the mandrel (as will be explained), whose spiral holder grips the inside of the shell. Whereas the holder 36 enters the shell with freedom, being calibrated to a somewhat less dimension at its greatest gripping diameter than the inside of the shell, upon the shell meeting with resistance to endwise movement and the spiral holder being compressed longitudinally the holder expands transversely as an incident to the longitudinal contraction thereof, thus setting up an internal grip on the shell, causing it to rotate with it. Each pocket has as it rearward limit a stripper 46, and when subsequently the holder is withdrawn the shell is prevented from receding with it by the stripper, and remains behind in the pocket.

The shells, delivered to the pockets by the means including the chutes 48, are held in the pockets by their holders telescoping them from a point in the cycle of the shell carrier near where they enter the pockets (directly over shaft 10) to a point distant somewhat less than three quarters of the cycle, where at 49 there is a delivery chute for the shells; to insure the shells leaving the pockets at the latter point there is a deflector 50 which projects into the groove 43 of disk 41.

Keyed to the shaft 10 forward of disk 41 is a turret 51 which affords the aforementioned resistance to the thrust of the shells under the impulse of the corresponding mandrels in telescoping the shells and which also affords guideways for the chucks or holders of the tools for operating on the shells.

Parallel with the shaft 10 the turret is formed with a circular series of bores 52 respectively alined with the mandrels. In the rear end of each bore is screwed a socket 53 (Fig. 11) in which is journaled in anti-friction bearings 54 the thrust bearing member 55, having an axially arranged cylindrical nipple 56 projecting from its inner end, which affords a flat face to bear against the flat end face of the shell with the nipple snugly fitting the previously formed percussion cap chamber in the shell and thus centering the latter with reference to said member. When the mandrel telescopes the shell and the latter abuts against the member 55, such member, being free to rotate on account of its anti-friction bearings, revolves with the rotated shell.

A chuck 57 slides in each bore 52 forward of the socket 53 and has extending axially therethrough a drill holder 58, held therein by a set screw 59 and equipped with a drill 60. The chuck has a roller 61 engaged in the cam groove of a barral cam 62 suitably held against turning in the standard 2. The free end of the drill holder may be guided by a tubular spindle 63 secured axially in the rear end of socket 53, and the drill may in turn be guided by a ferrule 64 (which it penetrates and snugly fits) at the free end of the tubular spindle 63. At a suitable time after any one shell is thrust forward by its mandrel against the bearing member 55, the drill is forced rearwardly by the cam 62 as the turret sweeps around, and the drill being held stationary while the shell is rotated, the priming hole is drilled in the end of the shell, being exactly centered because the shell is centered by the nipple 56.

A ring 65 is secured on and in concentric relation to the turret 51, being in effect a flange thereon. Its rear face is provided with a series of grooves 66, one side of each of which is radial of the ring (Fig. 7); these grooves are all covered by an annular plate 67, secured to the ring by screws or otherwise (Figs. 4 and 6), so that they form substantially radial guideways. In each guideway is arranged a cutter holder (Fig. 8) formed in two parts 68, 69. Part 68 has a longitudinal dove-tailed groove 68$^a$ and a forwardly projecting obliquely grooved jaw 68$^b$ in which the cutter, 70, is suitably held, such cutter being shaped to the profile to be formed on the shell when cannelured and having a point 70$^a$ spaced from a shell-head abutment 70$^b$ by a groove in which the edge or flange of the head A of the shell B fits snugly. Part 69 is dovetailed in cross-section and fits the groove 68$^a$ of part 68, and it contains a forwardly protruding button 69$^a$ backed by a spring 69$^b$ (Fig. 7); part 69 also has an upstanding lug 69$^c$ whereby, by means of a screw 71 tapped into said lug and adapted to bear against part 68 and a screw 72 (Fig. 7) tapped into part 68 and adapted to bear against part 69, said parts may be adjusted to set the cutter forward or back. The spring-pressed plug, by bearing against the periphery of the turret at 51$^a$ (Fig. 4), normally tends to hold the cutter clear of the work. However, an arc-shaped cam member 74, whose inner surface 75 is slightly eccentric to the turret, is so secured to upright 3 and base 1 that when each holder has been carried around by the turret 90° from the point where the corresponding pocket 43 receives a shell surface 75 begins to urge the cutter against the shell, so that the cannelure C will be formed thereby immediately adjacent the head A, the spring 69$^b$ immediately retracting the holder when the cam has been passed.

Operation: The shells are delivered to the pockets 43 of the rotating structure including shaft 10, turrets 11 and 51 of the carrier 41—42 one after another, the mandrel, drill and cutter corresponding to each pocket being retracted at the moment of delivery of the shell thereto. Soon after the delivery of a shell to its pocket the corresponding mandrel, rotated on its own axis as described while it advances with said structure around the axis of shaft 10, is thrust forward by camway 16, telescoping and gripping the shell and thereby rotating it, first forcing it for this purpose against the corresponding freely rotative bearing member 55, whose nipple 56 obturates the percussion cap chamber D of the shell and thus centers the latter. After the shell had thus been clamped between the mandrel and turret 51 and gripped and set rotating by the mandrel, cam 62 causes the corresponding drill to advance and form the priming hole in the head of the shell and cam member 74 forces radially inwardly the corresponding cutter (whose groove is arranged then to exactly register with the edge or flange of the shell head A), which produces the cannelure C immediately back of the shell head and trims the periphery of the latter to a finished shape. The drill and cutter are then withdrawn, the former by its cam and the latter by its spring 69$^b$; then the mandrel is retracted by its camway 16 and, bringing the shell against the stripper 46, clears the shell, leaving it in the pocket; finally, the pocket approaching the delivery chute the shell either falls or by the deflector 50 is picked off into such chute.

Starting and stopping of the machine are effected by the levers 76 which suitably control a clutch 77 on shaft 6. That is, there is a pair of levers 76 on one side of the machine (connected by a rod 76$^a$ to move together) and a single lever 76 on the other side, respectively connected with the clutch 77 by a lever 78. So that movement of any one lever in either direction results in movement of all the rest, as well as of the clutch.

Occasionally a drill 60 will break, and if unnoticed this would lead to delivery of shells appertaining to the broken drill that are undrilled, necessitating sorting of the shells in order to eliminate unfinished product. I therefore preferably provide the machine with means to effect automatic stopping, thus: The train of levers 75—78 is normally held in the position to "open" the clutch by a spring 79 (Fig. 1). When they are moved to "close" the clutch a detent pawl 80 is by a spring-pin 81 moved into abutting relation to a shoulder 82 on one of the levers 76. This pawl is suitably connected to the movable core 83 of a solenoid 84 in an electric circuit 85 which has a circuit-closing controller device 86 (Figs. 13 and 14) which is fulcrumed in standard 3 on an axis parallel with the drills and includes a blade-shaped arm 87 resting edgewise on and held by gravity against the circular series of drills. This arm has such length that it will be held by any two adjoining but not by any other two drills against moving across the path of advance of the drills, wherefore if a drill breaks off, as soon as the resulting space coincides with the controller device the latter will move and close the circuit so that the solenoid acts to withdraw the detent pawl and permit spring 79 to effect movement of the clutch to the "open" position.

Having thus fully described my invention, what I claim as new and desire to secure by Letters Patent is:—

1. In combination, a rotary carrier member for the tubular articles to be operated upon having a series of pockets arranged around, and each pocket substantially parallel with, the axis of rotation of said member, an abutment member arranged beside the carrier member, means, rotative around said axis, to force and thereupon hold each article in a pocket against the abutment member, and means thereupon to operate on each article.

2. In combination, a rotary carrier member for the tubular articles to be operated upon having a series of pockets arranged around, and each pocket substantially parallel with, the axis of rotation of said member, an abutment member arranged beside the carrier member, means, rotative around said axis with the carrier, to force and thereupon hold each article in a pocket against the abutment member, and means thereupon to operate on each article.

3. A mechanism for operating on tubular articles including, in combination, a rotary carrier for the articles having a series of pockets arranged around, and each pocket substantially parallel with, the axis of rotation of said member, an abutment member arranged beside the carrier member, means to feed the articles successively into the pockets, and means, rotative around said axis, to successively force the articles in the pockets against the abutment member.

4. A mechanism for operating on tubular articles including, in combination, a rotary carrier member for the articles having a series of pockets arranged around, and each pocket substantially parallel with, the axis of rotation of said member, an abutment member arranged beside the carrier member and having thrust bearing devices journaled therein parallel with said axis and alined with the series of pockets, and means to force the articles in the pockets against said devices.

5. In combination, a rotary carrier member for the tubular articles to be operated upon having a series of pockets arranged around, and each pocket substantially parallel with, the axis of rotation of said member, means to rotate the carrier member, an abutment member arranged beside and rotative with the carrier member, means to force and thereupon hold each article in a pocket against the abutment member, and means thereupon to operate on each article.

6. In combination, a rotary carrier member for the tubular articles to be operated upon having a series of pockets arranged around, and each pocket substantially parallel with, the axis of rotation of said member, means to rotate the carrier member, an abutment member arranged beside the carrier member, and having thrust bearing devices journaled therein parallel with said axis and alined with the pockets, means to force and thereupon hold each article in a pocket against the corresponding bearing device, means to rotate the articles, and means to operate on the rotating articles.

7. A mechanism for operating on tubular articles including, in combination, a rotary carrier member for the articles having a series of pockets arranged around, and each pocket substantially parallel with, the axis of rotation of said member, an abutment member arranged beside the carrier member, means to force the articles in the pockets against the abutment member, a thrust tool arranged to penetrate the abutment member opposite the circular path of travel of the pockets, and means to effect thrust movement of the tool toward and from the carrier.

8. In combination, a rotary carrier member for the tubular articles to be operated on having a series of pockets arranged around, and each pocket substantially parallel with, the axis of rotation of said member, means to rotate the carrier member, an abutment member arranged beside the carrier member, means to force and thereupon hold each article in a pocket against the abutment member, a thrust tool alined with each pocket and arranged in the abutment member, and means to effect thrust movement of each tool toward and from the corresponding pocket.

9. A mechanism for operating on tubular articles including, in combination, a rotary carrier member for the articles having a series of pockets arranged around, and each pocket substantially parallel with, the axis of rotation of said member, an abutment member arranged beside the carrier member, means to force the articles in the pockets against the abutment member, a thrust tool arranged to penetrate the abutment member opposite the circular path of travel of the pockets, means to effect thrust movement of the tool toward and from the carrier, and means to cause relative rotation of the first named means and said tool around the axis of the latter during its thrust movement.

10. In combination, a rotary carrier member for the tubular articles to be operated on having a series of pockets arranged around, and each pocket substantially parallel with, the axis of rotation of said member, means to rotate the carrier member, an abutment member arranged beside the carrier member, means to force and thereupon hold each article in a pocket against the abutment member, a thrust tool alined with each pocket and arranged in the abutment member, means to effect thrust movement of each tool toward and from the corresponding pocket, and means to effect relative rotation as between each corresponding tool and article during thrust movement of the tool.

11. In combination, a rotary carrier member for the tubular articles to be operated on having a series of pockets arranged around, and each pocket substantially parallel with, the axis of rotation of said member, means to rotate the carrier member, an abutment member arranged beside the carrier member, means to force and thereupon hold each article in a pocket against the abutment member, tools in the abutment member operatively coördinated with said pockets, and means to move each tool transversely of the axis of the corresponding pocket to bring the tool laterally against the corresponding article.

12. In combination, a rotary carrier member for the tubular articles to be operated on having a series of pockets arranged around, and each pocket substantially parallel with, the axis of rotation of said member, means to rotate the carrier member, an abutment member arranged beside the carrier member, means to force and thereupon hold each article in a pocket against the abutment member, tools in the abutment member operatively coördinated with said pockets, means to move each tool transversely of the axis of the corresponding pocket to bring the tool laterally against the corresponding article, and means to effect relative rotation as between each corresponding tool and article.

13. In combination, a rotary carrier member for the articles to be operated upon having a series of peripherally open pockets in its periphery, means to deliver the articles to the pockets from a point in the same plane as the carrier member, an abutment member beside the carrier member, means, movable transversely of the plane of the carrier member, to force and hold the articles against the abutment member, and means to operate on the articles while so held.

14. In combination, a rotary carrier member for the tubular articles to be operated upon having a series of peripherally open pockets in its periphery, means to deliver the articles to the pockets from a point in the same plane as the carrier member, an abutment member beside the carrier member, mandrels, movable thrustwise transversely of the carrier member, to telescope the articles and thereupon hold them against the abutment member, and means to operate on the articles while so held.

15. In combination, a rotary carrier member for the tubular articles to be operated upon having a series of peripherally open pockets in its periphery, means to deliver the articles to the pockets from a point in the same plane as the carrier member, an abutment member beside the carrier member, rotary mandrels, movable thrustwise transversely of the carrier member, to telescope and grip the articles and thereupon hold them against the abutment member, means to rotate the mandrels and means to operate on the articles while held by the mandrels against said abutment member.

16. In combination, a rotary structure including a pair of spaced turrets arranged side by side, a plurality of drill members arranged in one turret, a plurality of mandrel members respectively alined with the drill members and arranged in the other turret, means to introduce the articles to be operated upon between the mandrel and drill members, means to cause thrust movement of one set of members toward the other, and means to rotate one set of members on their respective axes in the turret member carrying them.

17. In combination, a rotary structure including a pair of spaced turrets arranged side by side, a plurality of tool members arranged in one turret and movable transversely of the axis of rotation of said structure, a plurality of mandrel members movable each thrustwise in the other turret member substantially parallel with said axis and each operatively coördinated with a tool member, means to effect movement of said tool members in the thrust member carrying them, and means to effect thrust movement of the mandrel members.

18. In combination, a rotary structure including a pair of spaced turrets arranged side by side, a plurality of drill members arranged in one turret, a plurality of mandrel members respectively alined with the drill members and arranged in the other turret, means to introduce the articles to be operated upon between the mandrel and drill members, means to cause thrust movement of one set of members toward the other, tool members arranged in one turret member and operative against the articles relatively laterally thereof, and means to rotate each tool member and mandrel member one relatively to the other on the axis of the mandrel member.

19. In combination, a rotary structure, means, rotative therein on an axis parallel with the axis thereof, to hold and rotate the article to be operated upon, a tool movable in said structure transversely of said axis against the article, and a cam against which said tool is moved by said structure and adapted to move the tool in said structure.

20. In combination, a rotary structure, means, rotative therein on an axis parallel with the axis thereof, to hold and rotate the article to be operated upon, a tool movable in said structure transversely of said axis against the article, a cam against which said tool is moved by said structure and adapted to move the tool in said structure, and means to return the tool when so moved by the cam.

21. In combination, a supporting structure, a pair of spaced coaxial turrets journaled therein, one forming a work abutment turret, a plurality of tools slidable in the abutment-forming turret substantially longitudinally of the axis of rotation of said turrets, a plurality of mandrels slidable in the other turret substantially longitudinally of said axis and respectively coördinated with said tools, cam means controlling the mandrels and tools and relatively to which said turrets rotate, and means to introduce the work between the mandrels and tools.

22. In combination, a supporting structure, a pair of spaced coaxial turrets journaled therein, one forming a work abutment turret, a plurality of tools slidable in the abutment-forming turret substantially longitudinally of the axis of rotation of said turrets, a plurality of mandrels slidable in the other turret substantially longitudinally of said axis and respectively coördinated with said tools, cam means controlling the mandrels and tools and relatively to which said turrets rotate, other tools movable in the abutment-forming turret and coördinated with the mandrels, cam means controlling the latter tools and relatively to which said turrets rotate, and means to introduce the work between the mandrels and tools.

23. Means to hold a tubular article while being operated upon including an article telescoping mandrel member having a spiral article-telescoping portion, and an abutment member opposite the free end of such portion free to contract longitudinally, one member being movable toward the other to cause longitudinal compression of said portion and said portion being thereby adapted to expand circumferentially to grip the article internally.

24. Means to hold a tubular article while being operated upon including an article telescoping mandrel member having a spiral spring article-telescoping portion free to contract longitudinally, and an abutment member opposite the free end of such portion, one member being movable toward the other to cause longitudinal compression of said portion and said portion being thereby adapted to expand circumferentially to grip the article internally.

25. In combination, an abutment member, means to hold the article under elastic pressure against the abutment member and rotate the same, and a tool operative on the article while so held and rotated.

26. In combination, an abutment member, means to hold the article under elastic pressure against the abutment member and rotate the same, and a tool operative on the article while so held and rotated, said member having the portion thereof abutted by the article freely rotative on the same axis as the article.

27. In combination, an abutment member, means to hold the article under elastic pressure against the abutment member and rotate the same, and a tool operative on the article while so held and rotated, the article and the portion of said member abutted by the article having a coengaging centering projection and recess centered relatively to the axis of rotation of the article.

28. In combination, an abutment member, means to hold the article against the abutment member and rotate the same, and a tool operative on the article axially thereof while so held and rotated.

29. In combination, an abutment member, means to hold the article against the abutment member and rotate the same, and a tool operative on the article while so held and rotated, said member having the portion thereof abutted by the article freely rotative on the same axis as the article and penetrated axially by said tool.

30. In combination, an abutment member, means to hold the article against the abutment member and rotate the same, and a tool operative on the article while so held and rotated, the article and the portion of said member abutted by the article having a coengaging centering projection and recess centered relatively to the axis of rotation of the article and penetrated axially by said tool.

31. In combination, with means to operate on the articles including a series of substantially regularly spaced tools and means to advance them all in substantially the same path, means to control the advancing means having a tool-controlled controller device normally held in position to be engaged successively by said tools.

32. In combination, with means to operate on the articles including a series of substantially regularly spaced tools and means to advance them all in substantially the same path, means to control the advancing means having a tool-controlled controller device normally impelled in a direction across said path, each two adjoining tools being spaced to prevent, and any other two tools spaced to permit, movement of said device in said direction.

In testimony whereof I affix my signature.
AMOS CALLESON.